(12) United States Patent
Miron et al.

(10) Patent No.: US 12,719,244 B2
(45) **Date of Patent: *Aug. 25, 2026**

(54) SYSTEM AND METHOD FOR USING A REMOTELY OPERATED FLYING VEHICLE TO MOUNT A DEVICE ON AN ELECTRIC CABLE OR DISMOUNT THEREFROM

(71) Applicant: ELECTRICAL GRID MONITORING LTD., Rosh Haayin (IL)

(72) Inventors: Eyal Eliyahu Miron, Hod Hasharon (IL); Nimrod Sandlerman, Ramat-Gan (IL)

(73) Assignee: ELECTRICAL GRID MONITORING LTD., Rosh Haayin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/298,238

(22) Filed: Aug. 13, 2025

(65) Prior Publication Data

US 2025/0372964 A1 Dec. 4, 2025

Related U.S. Application Data

(63) Continuation of application No. 18/433,527, filed on Feb. 6, 2024, now Pat. No. 12,483,011, which is a (Continued)

(51) Int. Cl.
*H02G 1/02* (2006.01)
*B64C 39/02* (2023.01)
(Continued)

(52) U.S. Cl.
CPC ............. *H02G 1/02* (2013.01); *B64C 39/024* (2013.01); *B64U 10/60* (2023.01); *B64U 10/13* (2023.01); *B64U 30/20* (2023.01); *B64U 50/19* (2023.01); *B64U 2101/00* (2023.01); *B64U 2101/30* (2023.01); *B64U 2201/10* (2023.01); *B64U 2201/20* (2023.01)

(58) Field of Classification Search
CPC ......... B64C 39/024; B64U 10/60; H02G 1/02
See application file for complete search history.

(56) References Cited

U.S. PATENT DOCUMENTS 12,046,887 B2 * 7/2024 Johansen ................. H02G 1/02
2016/0023761 A1 * 1/2016 McNally .............. G05D 1/0094 701/3
2019/0106212 A1 * 4/2019 Furukawa .......... B65H 75/4484

* cited by examiner

*Primary Examiner* — Luke Huynh
(74) *Attorney, Agent, or Firm* — AlphaPatent Associates Ltd.; Daniel J. Swirsky

(57) ABSTRACT

A system, a method, and/or a computer program for mounting a cable device on an electric cable of an electric grid, and dismounting therefrom, the mounting device including a first coupling part arranged to attach the mounting device to a flying vehicle, a second coupling part arranged to attach the cable device to the mounting device, and a navigation part operative to enable a user to navigate the flying vehicle so as to direct a slot of the cable device to the electric cable, and/or automatically navigate the flying vehicle to direct the slot of the cable device to the electric cable, and/or enable a user to navigate the flying vehicle to the cable device, and/or automatically navigate the flying vehicle to the cable device.

17 Claims, 8 Drawing Sheets

Related U.S. Application Data continuation of application No. 16/976,772, filed as application No. PCT/IB2019/051698 on Mar. 3, 2019, now Pat. No. 11,929,597.

(60) Provisional application No. 62/639,540, filed on Mar. 7, 2018.

(51) Int. Cl.

| | |
|---|---|
| ***B64U 10/60*** | (2023.01) |
| *B64U 10/13* | (2023.01) |
| *B64U 30/20* | (2023.01) |
| *B64U 50/19* | (2023.01) |
| *B64U 101/00* | (2023.01) |
| *B64U 101/30* | (2023.01) |

11
12
24
36
37
38
39
40
41
42
43
44
45
46
47
48
49
50
51
52
53
54
55
56

18
57

15
20
12
22
19
59
58
10
21
15
14
11
20

15
19
58
10
22
12
21
20
59
14
19
18
11
15

15
19
58
12
20
59
22
18
14
11
19
15
10
21

58
19
20
59
12
22
18
11
19
14
15
10
21

15
66
15
62
14 61
10
21
60
19
65
19
11
64
63
18
12

15
66
63
21
10
67
16
62
61
60
14
65
19
64
11
18
12

SYSTEM AND METHOD FOR USING A REMOTELY OPERATED FLYING VEHICLE TO MOUNT A DEVICE ON AN ELECTRIC CABLE OR DISMOUNT THEREFROM

FIELD

The method and apparatus disclosed herein are related to the field of electric grid, and, more particularly but not exclusively, to electric transmission and distribution networks and, more particularly but not exclusively, to detecting faults in an electric grid by means of a sensor mounted on the electric cable, and, more particularly but not exclusively, to using unmanned flying vehicle to mount a sensor, or any other device, on an electric cable or dismount therefrom.

BACKGROUND

The electric grid may have many faults. Various components of the grid may fail, and a failure may be instantaneous, gradual, or intermittent. Some faults may be caused by the environment, such as humidity, smoke, dust, wind, trees, etc. Various faults and failures may have different characteristics and affect the network in different ways. Characterizing, detecting, identifying and localizing faults in an electric grid is a known problem with various solution including various types of sensors mounted on the cable of the electric grid. Other devices mounted on the electric cable are also known, such as devices for warning aircrafts. Mounting and dismounting such devices on cables, particularly without disrupting the power supply, is complicated, dangerous, laborious, and costly. It would therefore be highly advantageous to have devoid of the above limitations.

SUMMARY

According to one exemplary embodiment of the invention there is provided a system, a method, and/or a computer program for mounting a cable device on an electric cable of an electric grid, and/or dismounting the cable device from the electric cable, the mounting device including a first coupling part arranged to attach the mounting device to a flying vehicle, a second coupling part arranged to attach the cable device to the mounting device, and a navigation part operative to enable a user to navigate the flying vehicle so as to direct a slot of the cable device to the electric cable, and/or automatically navigate the flying vehicle to direct the slot of the cable device to the electric cable, and/or enable a user to navigate the flying vehicle to the cable device, and/or automatically navigate the flying vehicle to the cable device.

According to another exemplary embodiment of the invention the navigation part may be operative to enable a user to control the flying vehicle so as to align the slot of the cable device to the electric cable, and/or automatically control the flying vehicle so as to align the slot of the cable device to the electric cable, and/or enable a user to control the flying vehicle so as to mount the cable device on the electric cable, and/or automatically control the flying vehicle so as to mount the cable device on the electric cable, and/or enable a user to control the flying vehicle so as to align the mounting device with the cable device mounted on the electric cable, and/or automatically control the flying vehicle so as to align the mounting device with the cable device mounted on the electric cable.

According to yet another exemplary embodiment of the invention the navigation part is operative to perform navigation using optical imagery of one or more the electric cable and the cable device, and/or navigation according to one or more electric field and magnetic field emitted by one or more the electric cable and the cable device.

According to still another exemplary embodiment of the invention the mounting device may additionally include a local communication device operative to communicatively couple to the flying vehicle local control system so as to perform the automatically control the flying vehicle.

Yet according to another exemplary embodiment of the invention the mounting device may additionally include a remote communication device communicatively coupled to a remote-control device, the remote communication device communicating with the remote-control device navigation data from the mounting device to the remote-control device, and/or navigation control data from the remote-control device to the mounting device.

Further according to another exemplary embodiment of the invention the mounting device may additionally include a remote-control device operative to enable a user to control the flying vehicle so as to align the slot of the cable device to the electric cable, and/or control the flying vehicle so as to align the mounting device with the cable device mounted on the electric cable, and/or control the flying vehicle so as to mount the cable device on the electric cable, and/or control the flying vehicle so as to dismount the cable device from the electric cable, and/or switch the mounting device to automatic operation using a communication device communicatively coupled to the flying vehicle local control system to perform the automatically control of the flying vehicle.

Still further according to another exemplary embodiment of the invention the second coupling part arranged to attach the cable device to the mounting device includes mechanical coupling, and/or an electromechanical coupling.

Even further according to another exemplary embodiment of the invention the mounting device may additionally include a locking actuator part operative to couple to a locking part of the cable device and to activate the locking part to lock the cable device to the electric cable, and/or to activate unlocking of the cable device from the electric cable, and/or to identify an indication of locking of the cable device to the electric cable, and/or to identify an indication of unlocking of the cable device to the electric cable.

Additionally, according to yet another exemplary embodiment of the invention, the mounting device may additionally include a manipulating device to maneuver the mounting part with respect to the flying vehicle in at least one of yaw, pitch and roll angles, and/or maneuver the cable device with respect to the mounting part in at least one of yaw, pitch and roll angles, and/or maneuver the cable device with respect to the electric cable in at least one of yaw, pitch, and roll angles, and/or maneuver the mounting part with respect to the cable device mounted on the electric cable in at least one of yaw, pitch and roll angles, and/or maneuver the mounting part without affecting at least one of yaw, pitch, and roll angles of the flying vehicle, and/or maneuver the cable device without affecting at least one of yaw, pitch, and roll angles of the flying vehicle.

According to still another exemplary embodiment of the invention, the mounting device is operative to maneuver the one or more yaw, pitch and roll angles according to data received from the navigation part.

Further according to another exemplary embodiment of the invention, a flying vehicle is provided for mounting a cable device on an electric cable of an electric grid, the flying vehicle including a mounting part, a sensor coupling part arranged to attach the cable device to the mounting part, a slot navigation part operative to enable a user to navigate the flying vehicle so as to direct a slot of the cable device to the electric cable, and/or to automatically navigate the flying vehicle to direct the slot of the cable device to the electric cable, and/or to enable a user to navigate the flying vehicle to the cable device, and/or to automatically navigate the flying vehicle to the cable device.

Yet further according to another exemplary embodiment of the invention, the flying vehicle may additionally comprise a copter coupling part arranged to attach the flying vehicle to the mounting part, the copter coupling part arranged to maneuver the mounting device with respect to the flying vehicle in at least one of yaw, pitch and roll angles according to data received from the slot navigation part.

Still further according to another exemplary embodiment of the invention, the flying vehicle may additionally include a long-range navigation part operative to enable a user to navigate the flying vehicle to direct the slot navigation part to the electric cable, and/or to automatically navigate the flying vehicle to direct the slot navigation part to the electric cable.

Even further according to another exemplary embodiment of the invention, a method for mounting of a cable device on an electric cable of an electric grid may include attaching the cable device to a mounting device attached to a flying vehicle, flying the flying vehicle, using a long-range navigation part, to the electric cable, directing s short-range navigation part to the electric cable, flying the flying vehicle, using the short-range navigation part, to the electric cable, aligning a slot of the cable device with the electric cable, and mounting the cable device on the electric cable where the electric cable is inserted in the slot of the cable device.

Additionally, according to yet another exemplary embodiment of the invention, a method for dismounting a cable device from an electric cable of an electric grid may include flying a flying vehicle, using a long-range navigation part, to the electric cable, identifying the cable device mounted on the electric cable, directing s short-range navigation part to the cable device, flying the flying vehicle, using the short-range navigation part, to the electric cable, aligning a mounting part of the flying vehicle to the cable device, unlocking the cable device from the electric cable, and dismounting the cable device from the electric cable.

Unless otherwise defined, all technical and scientific terms used herein have the same meaning as commonly understood by one of ordinary skill in the relevant art. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

BRIEF DESCRIPTION OF THE DRAWINGS

Various embodiments of the invention are described herein, by way of example only, with reference to the accompanying drawings. With specific reference now to the drawings in detail, it is stressed that the particulars shown are by way of example and for purposes of illustrative discussion of various embodiments of the invention only, and are presented in order to provide what is believed to be the most useful and readily understood description of the principles and conceptual aspects of the embodiment. In this regard, no attempt is made to show structural details of the embodiments of the invention in more detail than is necessary for a fundamental understanding of the subject matter, the description taken with the drawings making apparent to those skilled in the art how the several forms and structures may be embodied in practice.

In the drawings.

DETAILED DESCRIPTION

Figure 1:
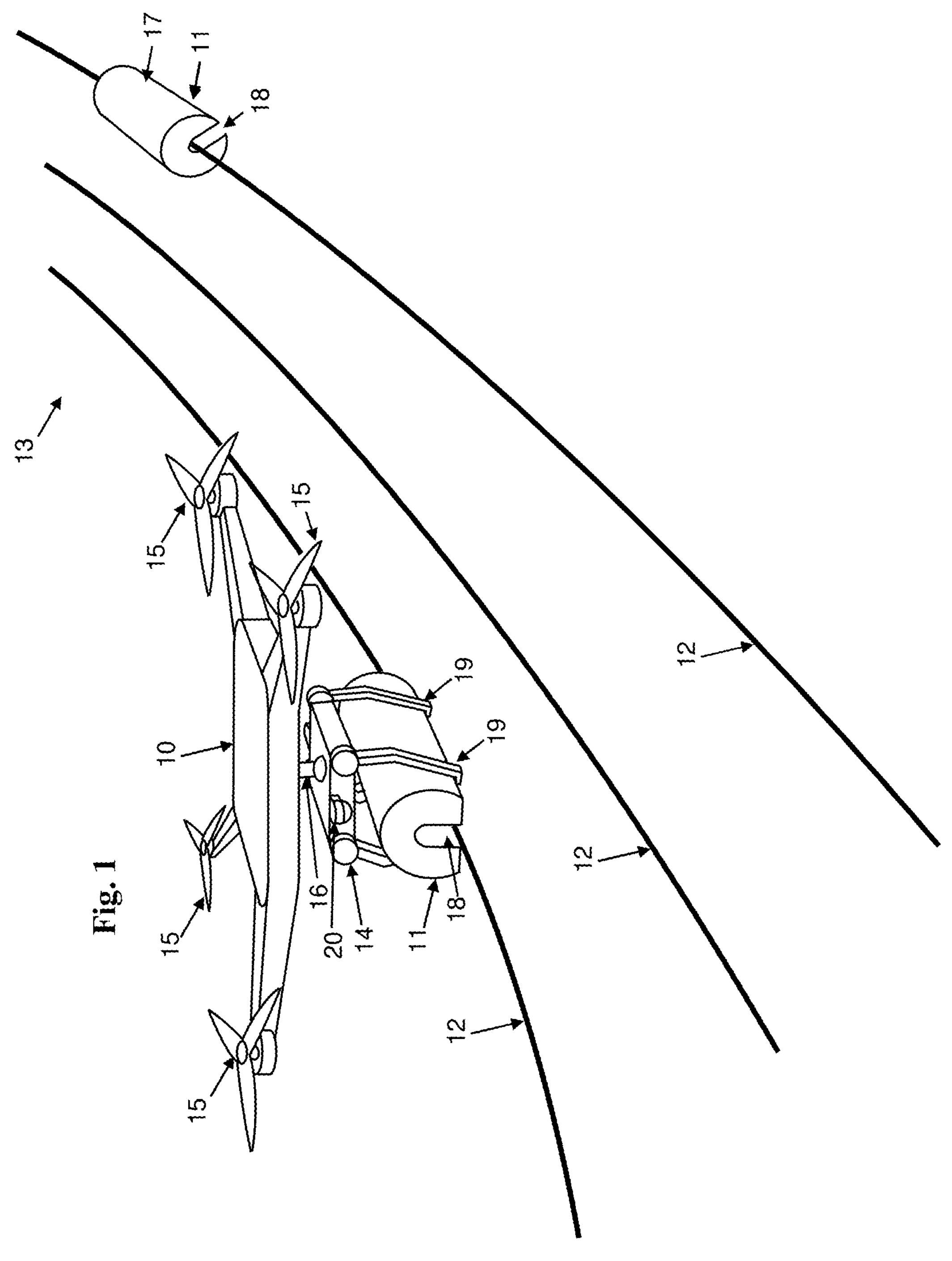
FIG. 1 is a simplified illustration of a flying vehicle including a mounting part installing a cable device on an electric cable of an electric grid.

The invention, in embodiments thereof, provides a method and a system for mounting a device on an electric cable using an unmanned flying vehicle and/or dismounting a device on an electric cable using an unmanned flying vehicle. The device may be a sensor, a warning sign, a communication node, etc. The unmanned flying vehicle may be a drone, a copter, a quadcopter, and/or any other flying vehicle. The flying vehicle may be remotely controlled or autonomous.

The principles and operation of the system and method for using a flying vehicle for mounting a device on an electric cable or dismounting therefrom according to the several exemplary embodiments of the invention may be better understood with reference to the following drawings and accompanying description.

Before explaining at least one embodiment of the invention in detail, it is to be understood that the embodiments of the invention are not limited in its application to the details of construction and the arrangement of the components set forth in the following description or illustrated in the drawings. Other embodiments of the invention may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different Figs. may use different scales and different scales can be used even within the same drawing, for example different scales for different views of the same object or different scales for the two adjacent objects.

The purpose of the embodiments of the invention is to use a flying vehicle to install or mount any device, and particularly a measuring device or a sensor, on an electric cable. The measuring device may measure various electric parameter in a plurality of locations in an electric network and determine, by comparing a plurality of measurements, that a fault exists, the type or characteristic of the fault, and its location. Another purpose of the embodiments of the invention is to use a flying vehicle to remove or dismount any device, and particularly a measuring device or a sensor, on an electric cable.

The term 'grid', or 'electric grid', may refer to the electric transmission network and/or the electric distribution network, and to any part of such network between the power generating station, or stations, and the load, or the consumer. The term 'cable', or 'electric cable', may refer to any single cable, or wire, of the grid, such as a phase carrying cable.

The term 'cable device' may refer to any device to be mounted on or dismounted from an electric cable of a grid, including a sensor, a measuring device, a communication device, a warning device, a marking device, etc. Typically, the cable device may derive power from the electric and/or magnetic field around the electric cable, where the electric and/or magnetic field may be generated by the electric current flowing in the electric cable.

The term 'flying vehicle' may refer to any type of device that is capable of flying or hovering and may be also capable of carrying the cable device and mount it on, or dismount it from, an electric cable. Particularly, the flying vehicle may include any type of unmanned flying vehicle, such as a drone, a copter, a quadcopter, etc. The flying vehicle may be remotely controlled, or autonomous, or both (in different parts of the flight, as described below).

The term 'measurement' or 'electrical measurement' may refer to any type of measurement of any electric parameter such as voltage, current, electric field, magnetic field, resistance, capacitance, inductance, electric charge, etc. The term 'physical measurement' or 'mechanical measurement' may refer to any type of measurement of any physical parameter other than electrical parameters. Such parameters may be temperature, wind, humidity, motion, height, (cable) depression, (cable) angle, etc. Such measurements are typically performed by a cable device mounted on an electric cable.

Reference is now made to FIG. 1, which is a simplified illustration of a flying vehicle 10 installing a cable device 11 on an electric cable 12 of an electric grid 13, according to one exemplary embodiment of the invention.

As shown in FIG. 1, the flying vehicle 10 may include an aerial propulsion system and a mounting part 14. The aerial propulsion system may include, for example, one or more propellers 15. Propellers 15 may be operated, for example, by means of electrical motors, which may be controlled by a first navigation system. However, alternatively and/or additionally, the aerial propulsion system may be operated using one- or more internal combustion engines, and/or include one or more jet-engines, turbo-fan jet-engines, turbo-prop jet-engines, etc. The aerial propulsion system may include any number of engines and/or propellers, typically 4 or 8.

The mounting part 14 may be an integral part of the flying vehicle 10 (i.e., integral mounting part 14). Alternatively the mounting part 14 may be a separate device that can be attached or coupled or clamped to various types of flying vehicles 10 (i.e., attachable mounting part 14).

The attachable mounting part 14 alleviates the need to design and produce the entire flying vehicle 10 and enables the use of an off-the-shelf flying vehicle 10. Additionally, the attachable mounting part 14 enables a single flying vehicle 10 to carry two or more mounting parts 14. However, the attachable mounting part 14 requires a (first) coupling device 16, which the integral mounting part 14 may not need.

For the purpose of the generality of the description it is appreciated that FIG. 1 may also show a flying vehicle 10 dismounting a cable device 11 from an electric cable 12 of an electric grid 13. Hence, flying vehicle 10 and mounting part 14 are together operative for mounting cable device 11 on an electric cable 12 of an electric grid 13, and for dismounting cable device 11 on an electric cable 12 of an electric grid 13.

FIG. 1 also shows another cable device 11, designated by numeral 17, already mounted on another cable 12 of the electric grid 13.

As shown in FIG. 1, mounting a cable device 11 on an electric cable 12 may include inserting the cable into a mounting slot 18 in the cable device 11. In other words, mounting a cable device 11 on an electric cable 12 may involve directing the mounting slot 18 of the cable device 11 onto the electric cable 12. Otherwise put, mounting a cable device 11 on an electric cable 12 may involve guiding and/or navigating flying vehicle 10 (and mounting part 14) to electric cable 12 so that slot 18 of cable device 11 engulfs electric cable 12. Thereafter mounting part 14 may operate a clamping device (cable clamping part) within cable device 11 to secure cable device 11 to electric cable 12.

Similarly, dismounting cable device 11 from electric cable 12 may include guiding and/or navigating flying vehicle 10 (and mounting part 14) to the selected cable device 11 mounted on electric cable 12, attaching mounting part 14 to the selected cable device 11, operating the clamping device (cable clamping part) within cable device 11 to detach cable device 11 from electric cable 12, and removing cable device 11 from electric cable 12.

As shown in FIG. 1, mounting part 14 may include the following parts:

A first coupling part, such as coupling device 16, arranged to attach the mounting part 14 to the flying vehicle 10. This first coupling part may also be termed copter coupling part.

A second coupling part, such as arms 19, arranged to attach a cable device 11 to the mounting part 14. This second coupling part may also be termed sensor coupling part.

A navigation part (which may also be termed 'second navigation part, and/or short-range navigation, and/or part slot navigation part), including at least one navigation sensor, such as a camera 20, operative to perform at least one of:

Enable a user to mount a cable device 11 on an electric cable 12 of an electric grid 13 by navigating flying vehicle 10 so as to direct slot 18 of cable device 11 to electric cable 12 so that slot 18 is aligned with electric cable 12.

Enable a user to dismount a cable device 11 from an electric cable 12 of an electric grid 13 by navigating flying vehicle 10 to cable device 11 so that flying vehicle 10 is aligned with cable device 11.

Automatically navigate the flying vehicle to direct slot 18 of cable device 11 to electric cable 12 so that slot 18 is aligned with electric cable 12.

Automatically navigate flying vehicle 10 to cable device 11 so that flying vehicle 10 is aligned with cable device 11.

Figure 3:
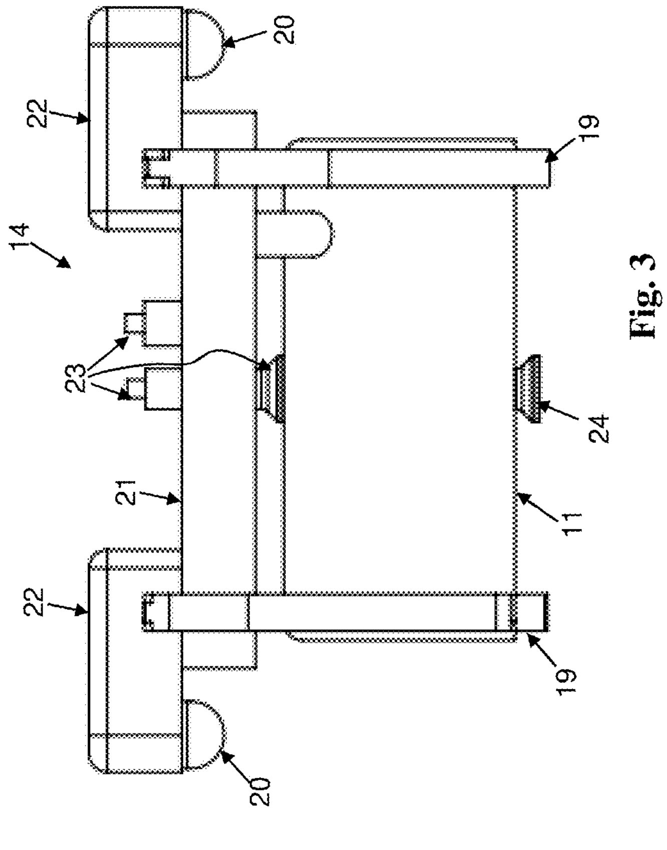
FIG. 3 is a simplified illustration of a side view of the mounting part.
Figure 2:
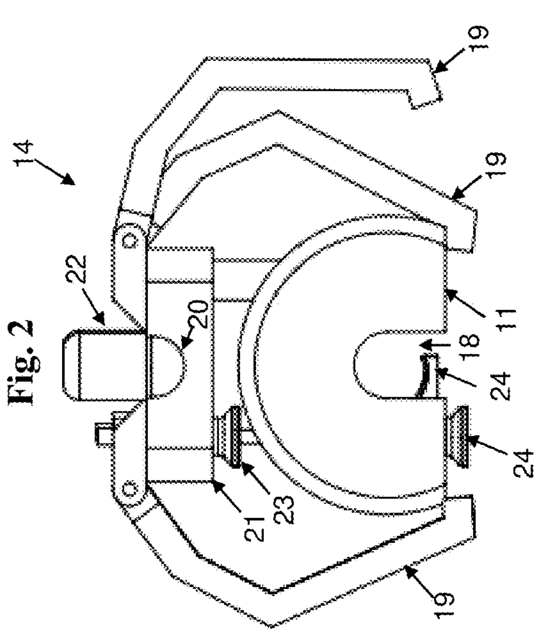
FIG. 2 is a simplified illustration of a front view of the mounting part.
Figure 5:
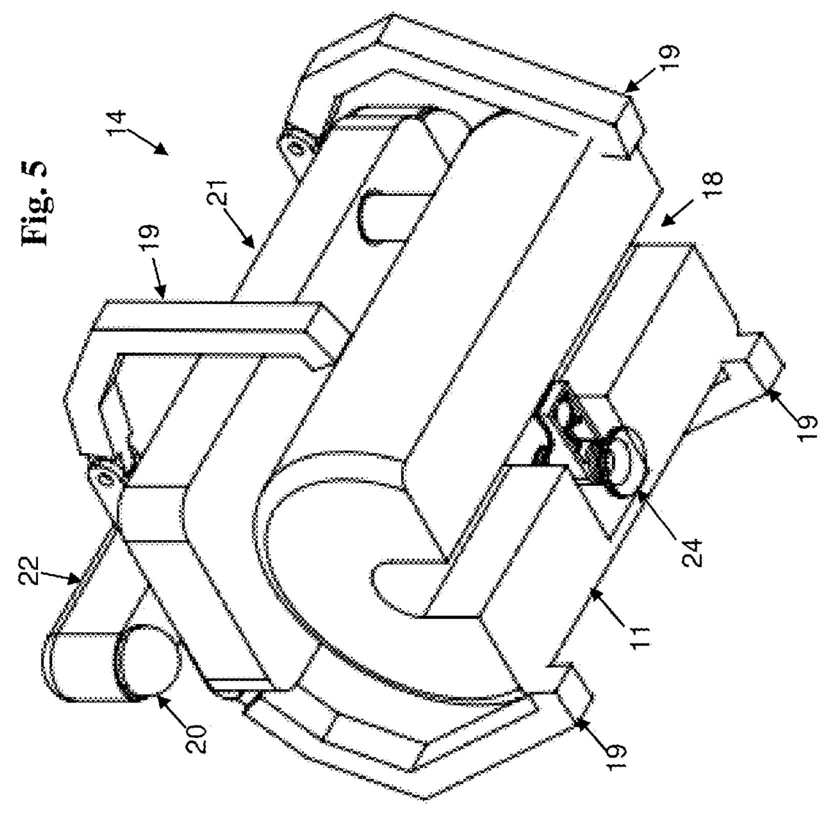
FIG. 5 is a simplified illustration of an oblique view of the mounting part.
Figure 4:
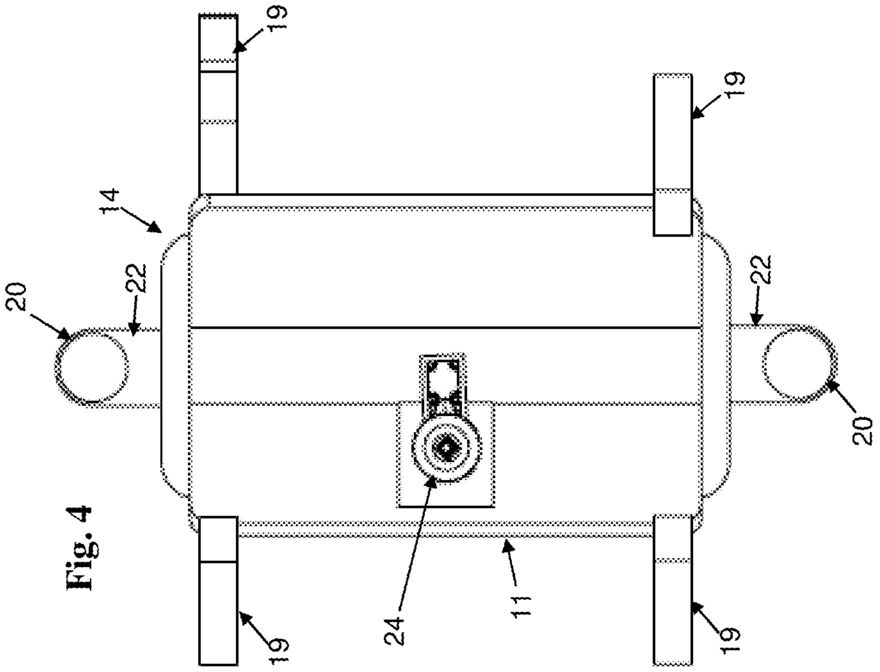
FIG. 4 is a simplified illustration of a bottom view of the mounting part.

Reference is now made to FIG. 2, which is a simplified illustration of a front view of mounting part 14, to FIG. 3, which is a simplified illustration of a side view of mounting part 14, to FIG. 4, which is a simplified illustration of a bottom view of mounting part 14, and to FIG. 5, which is a simplified illustration of an oblique view of mounting part 14, all according to one exemplary embodiment of the invention.

As an option, the illustrations of FIGS. 2, 3, 4 and 5 may be viewed in the context of the details of the previous Figures. Of course, however, the illustration of FIG. 5 may be viewed in the context of any desired environment. Further, the aforementioned definitions may equally apply to the description below. In FIGS. 2, 3, 4 and 5 mounting part 14 is shown carrying a cable device 11.

As shown in FIGS. 2, 3, 4 and 5, mounting part 14 may include a body 21, typically including electronics, typically including a computational device such as a microcontroller, operating, among other devices: The second coupling part, such as arms 19, coupled to body 21 and arranged to attach a cable device 11 to the. A navigation part 22, including at least one navigation sensor, such as camera 20. A cable attachment actuator part 23, coupled to body 21, and operative to actuate a cable clamping part 24 in the cable device 11.

Figure 6:
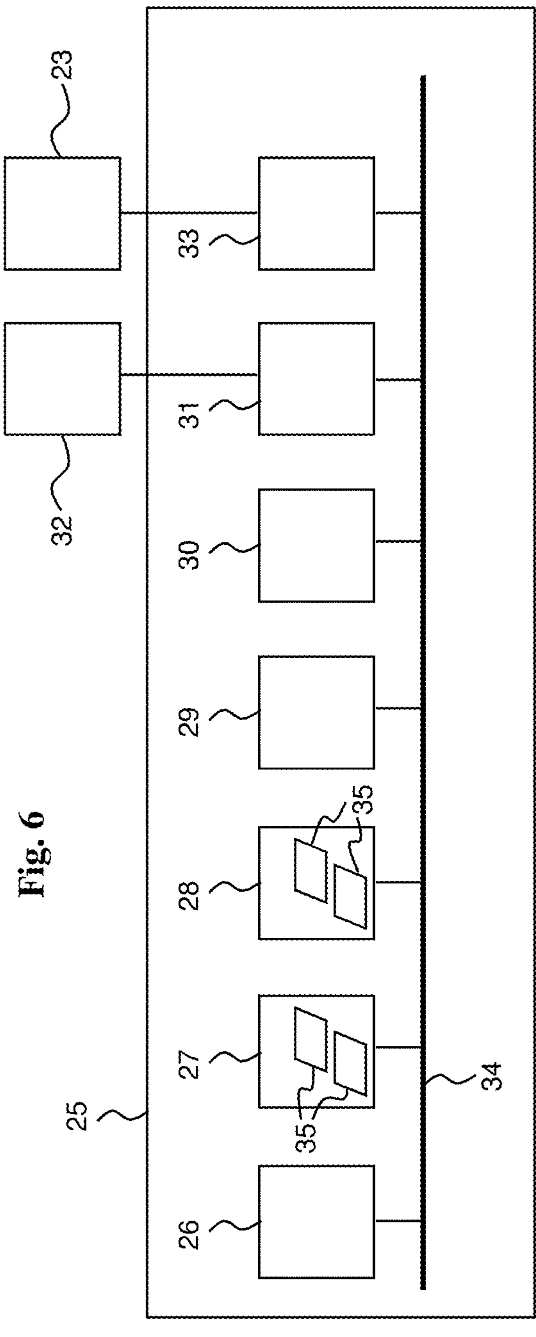
FIG. 6 is a simplified illustration of a computational device 1, typically included in body of the mounting part.

Reference is now made to FIG. 6, which is a simplified illustration of a computational device 25, typically included in body 21, according to one exemplary embodiment of the invention.

As an option, the illustrations of FIG. 6 may be viewed in the context of the details of the previous Figures. Of course, however, the illustration of FIG. 6 may be viewed in the context of any desired environment. Further, the aforementioned definitions may equally apply to the description below.

Computational device 25 is provided as an exemplary implementation of the processing part of mounting part 14. As such, computational device 25 may be arranged to operate the second coupling part, such as arms 19, navigation part 22, and cable attachment actuator part 23, as well as other devices coupled to, or included in, mounting part 14 and/or body 21 such as shown and described with reference to FIGS. 1 to 5.

As shown in FIG. 6, computational device 25 may include at least one processor unit 26, one or more memory units 27 (e.g., random access memory (RAM), a non-volatile memory such as a Flash memory, etc.), one or more storage units 28 (e.g. including a hard disk drive and/or a removable storage drive, representing a floppy disk drive, a magnetic tape drive, a compact disk drive, a flash memory device, etc.).

Computational device 25 may also include:

One or more communication units 29. Such communication unit 29 may use any type of communication technology, particularly RF communication technology, particularly communication technology such as Wi-Fi, Bluetooth, ZigBee, and any remote-control communication technology as may be used to remotely control flying vehicle 10.

One or more second coupling control circuitry 30 for controlling the second coupling part, such as arms 19. Particularly, maneuvering arms 19 to release cable device 11, and/or to be aligned with cable device 11, and/or to attach to cable device 11.

One or more navigation sensors control circuitry 31 for controlling navigation sensors, such cameras 20, optionally including the navigation sensors 32 themselves.

One or more one or more cable attachment control circuitry 33 for controlling cable attachment actuator parts 23, as well as the cable attachment actuator parts 23 themselves.

One or more communication buses 34 connecting the above units.

Computational device 25 may also include one or more control circuitry for controlling other devices coupled to, or included in, body 21.

Computing system 25 may also include one or more computer programs 35, or computer control logic algorithms, which may be stored in any of the memory units 27 and/or storage units 28. Such computer programs, when executed, enable computing system 25 to perform various functions as set forth herein. Memory units 27 and/or storage units 28 and/or any other storage are possible examples of tangible computer-readable media.

Particularly, computer programs 35 may include a software program for:

Operating and/or controlling communication unit(s) 29.

Operating and/or controlling devices coupled to, or included in, body 21 such as the second coupling part, such as arms 19, navigation part 22, navigation sensor 32, such a camera 20, cable attachment actuator part 23, etc.

Communicating with a user operating flying vehicle 10 (operator).

Communicating with a computing system and/or one or more computer programs operating and/or controlling flying vehicle 10.

Communicating with a computing system and/or one or more computer programs operating and/or controlling cable device 11.

Navigating flying vehicle 10, and/or mounting part 14, and/or cable device 11 to cable 12, to mount cable device 11 on cable 12.

Navigating flying vehicle 10, and/or mounting part 14 to cable device 11 mounted on cable 12, and to dismount cable device 11 on cable 12.

Computing system 25 may execute any software programs such as for analyzing measurements taken by any one or more cable device 11 of FIGS. 1 to 5, Operating and/or controlling devices coupled to, or included in, body 21 such as the second coupling part, such as arms 19, navigation part 22, navigation sensor, such a camera 20, cable attachment actuator part 23, etc.

For example, mounting part 14, and/or computing system 25, and/or computer programs 35 may perform the following:

Enable a user operating the flying vehicle 10 to navigate flying vehicle 10 to electric grid 13, such as to a particular part of electric grid 13.

Enable a user operating the flying vehicle 10 to identify a particular electric cable 12 of electric grid 13, and/or a particular cable device 11 mounted on a particular electric cable 12.

Enable a user operating the flying vehicle 10 to align slot 18 of cable device 11 with the particular electric cable 12. Enable engagement of the cable device 11 with the electric cable 12, and mounting cable device 11 on electric cable 12, including clamping cable device 11 to electric cable 12. This step may be operated automatically by the mounting part 14, and/or computing system 25, and/or computer programs 35 taking over the control of the flying vehicle 10 from the operating user.

Enable a user operating the flying vehicle 10 to align flying vehicle 10, and/or mounting part 14, and/or the second coupling part, and/or arms 19, with a particular cable device 11 mounted on electric cable 12. Enable engagement of the mounting part 14 with the cable device 11. Enable unclamping, and/or dismounting and/or removal of the cable device 11 from electric cable 12. This step may be also operated automatically by the mounting part 14, and/or computing system 25, and/or computer programs 35 taking over the control of the flying vehicle 10 from the operating user.

To precisely align slot 18 of cable device 11 with electric cable 12, mounting part 14 may operate flying vehicle 10 directly, for example by transmitting communication signals emulating the remote-control device as may be used by the user/operator. In a similarly manner mounting part 14 may operate flying vehicle 10 directly to precisely align the second coupling part, such as arms 19, with cable device 11 mounted on electric cable 12. Mounting part 14 may operate flying vehicle 10 by transmitting communication signals emulating the remote-control device via communication unit 29.

Mounting part 14 may operate flying vehicle 10 by communication unit 29 as a local communication device operative to communicatively couple to the local control system of flying vehicle 10 to automatically control the flying vehicle 10.

Mounting part 14 may navigate to electric cable 12 using optical imagery, for example, the optical imagery may be sourced from one or more optical sensors such as camera(s) 20 and processed by processor unit 26 and computer program 35. Alternatively or additionally, mounting part 14 may navigate to electric cable 12 using electrical sensors sensing the electric and/or magnetic field created by the electric current in the electric cable 12. Optical navigation is useful when the electric cable 12 does not carry electric current, and electromagnetic navigation is useful when the optical conditions are difficult, such as darkness, excessive brightness, unfavorable background, etc. Other navigation methods may include heat sensing of the cable, proximity sensing, etc.

Mounting part 14 may navigate to cable device 11 using optical imagery, for example, the optical imagery may be sourced from one or more optical sensors such as camera 20 and processed by processor unit 26 and computer program 35. Alternatively or additionally, mounting part 14 may navigate to cable device 11 using electrical sensors sensing the electric and/or magnetic field created by the electric current in the electric cable 12. Alternatively or additionally, mounting part 14 may navigate to cable device 11 using other types of radio frequency (RF) sensors sensing RF signal emitted by cable device 11, such as by a radio-frequency identification device (RFID), allowing navigation to unpowered and/or inoperative and/or faulty cable device 11.

For this purpose the system for using a flying vehicle to mount a sensor on an electric cable or dismount therefrom also include a remote-control operated by a user or operator. The remote-control may include two parts, a first remote-control part for operating the flying vehicle 10, and a second remote-control part for operating the mounting part 14, for example via communication unit 29. It is appreciated that the two control parts may be unified in one remote-control device. It is appreciated that the remote-control device nay be a proprietary device or a general purpose device such as a smartphone.

Mounting part 14, for example via communication unit 29, may provide the remote-control, particularly but not exclusively, the second remote-control part, with navigation data, and receive from the remote-control navigation-control data.

Navigation data may include, for example, imagery data from one or more cameras 20, and/or from one or more electromagnetic sensors, and/or an identification signal of a cable device 11, various control signals associated with the operation of the cable attachment system, etc.

Navigation-control data may include, for example, selection of a particular electric cable 12 of electric grid 13, selection of a particular location on the selected electric cable 12, a selected orientation of cable device 11 to electric cable 12 (e.g., according to the direction of the electric current), etc.

Navigation-control data may also include, for example, an instruction to mounting part 14, to take over the control of flying vehicle 10 and execute automatic navigation as described above, by directly operating flying vehicle 10.

As described above, the user or operator operating the system described above, and particularly operating the remote control device described above, may instruct the mounting part 14 to operate the cable attachment actuator part 23 to attach cable device 11 to electric cable 12, or to detach cable device 11 to electric cable 12, as described below.

The RFID embedded in cable device 11 may contain the unique identification of the device and when read by mounting part 14 may be used for positive verification for removing the correct device 11 off the cable.

Figures 7, 8A, 8B:
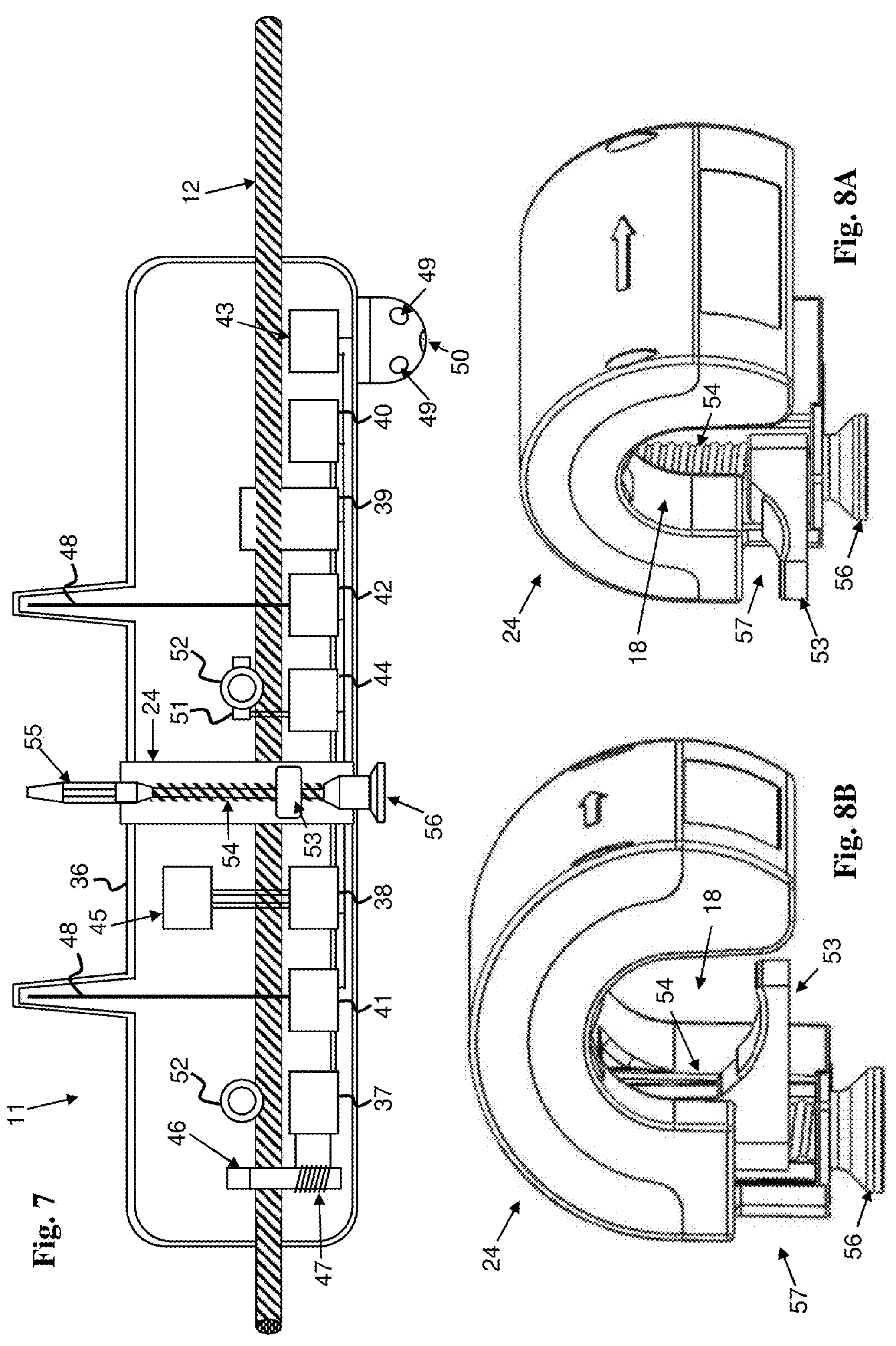
FIG. 7 is a simplified illustration of a cut through the cable device mounted on an electric cable.
FIG. 8A is a simplified illustration of cable clamping part of the cable device in an open position.
FIG. 8B is a simplified illustration of cable clamping part of the cable device in a closed position.

Reference is now made to FIG. 7, which is a simplified illustration of a cut through cable device 11 mounted on an electric cable 12, according to one exemplary embodiment of the invention.

As an option, the illustration of cable device 11 of FIG. 7 may be viewed in the context of the details of the previous Figures. Of course, however, the illustration of cable device 11 of FIG. 7 may be viewed in the context of any desired environment. Further, the aforementioned definitions may equally apply to the description below.

As shown in FIG. 7, the cable device 11 may include a box, or a body 36, through which the electric cable 12 passes. The electric cable 12 may be a part of an electric grid, an electric transmission network, or an electric distribution network, such as maintained by a power utility to provide electricity to the public, to industrial plants, etc. The cable device 11 may therefore be mounted on a live cable 12. That is, when cable 12 is fully powered and/or carries electric voltage and/or electric current.

The box 36 is therefore constructed of two parts which may be opened, and then closed around the cable 12. Alternatively, box 36 may be constructed of one part surrounding most of the cable diameter and having an opening at one side, such as slot 18, to insert cable 12 and attach the box to cable 12.

As shown in FIG. 7, the cable device 11 may include a power supply module 37, a controller module 38, one or more electric measuring devices 39, one or more physical measuring devices 40, and a backhaul communication module 41. Optionally, the cable device 11 may also include a local area communication module 42, a remote sensing module 43, and a propulsion control module 44. Optionally, the cable device 11 may also include cable clamping part 24, and a GPS module 45.

As shown in FIG. 7, the cable device 11 may include a magnetic core 46 over which at least one coil is wrapped to form a winding 47. The magnetic core 46 may be mounted around the electric cable 12. The magnetic core 46 may be constructed from two parts, a part in each of the two parts of box 36 where the two parts of the magnetic core 46 are closed around electric cable 12 when box 36 is attached to electric cable 12. However, optionally, and particularly for a high voltage cable, magnetic core 46 may be open in the sense that it has a slot though which electric cable 12 may be inserted.

The magnetic core 46 typically derives magnetic field from the electric current flowing in the electric cable 12. Winding 12 typically derives electric current from the magnetic flux in the magnetic core 46. Winding 12 may be electrically coupled to power supply module 37, typically providing electric voltage to other modules of cable device 46. It is appreciated that cable device 11 may derive electric power from a single electric cable 12.

Alternatively, for example when used with insulated high-voltage cables, and/or underground cables and/or low-voltage grids, power supply module 37 may be connected to sensors attached to electric cables deriving power supply from a main unit connected to a low voltage output of a transformer. Such configuration of cable device 11 may have only one part with an opening at the bottom.

Backhaul communication module 41 and local area communication module 42 may be coupled, each and/or both, to one or more antennas 48. Remote sensing module 19 may be coupled to and control various sensors, one or more cameras 49, one or more microphones 50, etc. It is appreciated that a camera can be mounted on a system of axels providing three-dimensional rotation. Alternatively, a plurality, or an array, of fixed cameras can be mounted to cover a large field of view as needed.

Backhaul communication module 41 and local area communication module 42 may use any type of communication technology and/or communication network such as, but not limited to: The terms 'communication technology', or 'communication network', or simply 'network' refer to any type of communication medium, including but not limited to, a fixed (wire, cable) network, a wireless network, and/or a satellite network, a wide area network (WAN) fixed or wireless, including various types of cellular networks, a local area network (LAN) fixed or wireless including Wi-Fi, and a personal area network (PAN) fixes or wireless including Bluetooth, ZigBee, and NFC, power line carrier (PLC) communication technology, etc. The terms 'communication network', or 'network' may refer to any number of networks and any combination of networks and/or communication technologies.

Optionally, cable device 11 may also include a global positioning service (GPS) module 45 and may use it to measure, monitor, and/or control the position of the cable device 11 along electric cable 12. GPS module 45 may also provide an accurate universal clock, for example, for accurately determining absolute time of measurement.

Controller module 14 may include a processor unit, one or more memory units (e.g., random access memory (RAM), a non-volatile memory such as a Flash memory, etc.), one or more storage units (e.g. including a hard disk drive and/or a removable storage drive, etc.) as may be used to store and/or to execute a software program and associated data and to communicate with external devices. Controller module 14 may be designed as computational device 25 of FIG. 6.

Propulsion control module 44 may be coupled to one or more actuating devices such as electric motor 51, which may be coupled to one or more wheels 52. Wheels 52 may be mounted on cable 12 to enable propulsion control module 44 to move the cable device 11 along cable 12 by controlling the electric motor 51.

It is appreciated that the propulsion system of cable device 11 (including, but not limited to propulsion control module 44, one or more electric motors 51 one or more wheels 52 etc.) may be operative to move cable device 11 along cable 12 and/or to rotate cable device 11 around cable 12.

It is appreciated that electric motor 51 represents herein any type of technology adequate to maneuver cable device 11 along and/or around cable 12, including, but not limited to, an AC motor, a DC motor, a stepper motor, a pneumatic pump and/or motor, a hydraulic pump and/or motor, or any other type of actuator.

Cable clamping part 24 may include, for example, a cable holder part 53 that may be pressed to cable 12 to firmly attach cable device 11 to cable 12. Cable holder part 53 may be maneuvered (e.g., up and down) by electrical means and/or by mechanical means such as a threaded rod 54. Threaded rod 54 may be operated by an electric actuator, or, as shown in FIG. 7, by a shaft 55 inserted into a socket of cable attachment actuator part 23. Alternatively, Threaded rod 54 may be operated by a rod inserted into socket 56.

Reference is now made to FIG. 8A, which is a simplified illustration of cable clamping part 24 in an open position, and to FIG. 8B, which is a simplified illustration of cable clamping part 24 in a closed position, according to one exemplary embodiment of the invention.

As an option, the illustrations of FIGS. 8A and 8B may be viewed in the context of the details of the previous Figures. Of course, however, the illustration of FIGS. 8A and 8B may be viewed in the context of any desired environment. Further, the aforementioned definitions may equally apply to the description below.

As shown in FIGS. 8A and 8B, turning threaded rod 54 (e.g., counterclockwise) to release cable device 11 from cable 12, for example by moving (lowering) cable holder part 53 away from cable 12, eventually also turns cable holder part 53 to clear slot 18, so that cable device 11 can be removed from cable 12. As shown in FIGS. 8A, cable holder part 53, when fully opened, turns into an opening 57, where it can be detected as fully opened, for example by camera 20.

Cable device 11, and particularly cable clamping part 24, may include one or more sensors for detecting and/or verifying that cable device 11 is correctly mounted on electric cable 12, and/or that cable holder part 53 is properly locked or unlocked. Such sensors may be operated by controller module 38 of cable device 11, which may report their measurements to processor unit 26 of mounting part 14, as shown and described with reference to FIG. 6.

Processor unit 26 of mounting part 14 and controller module 38 of cable device 11 may communicate with, for example, using communication unit 29 of mounting part 14 and local area communication module 42 of cable device 11.

Mounting part 14 may provide electric power to cable device 11 via a connector, or by electromagnetic induction, or using laser light. For example, mounting part 14 may provide electric power to cable device 11 via one or more connectors in arms 19.

Figure 9B:
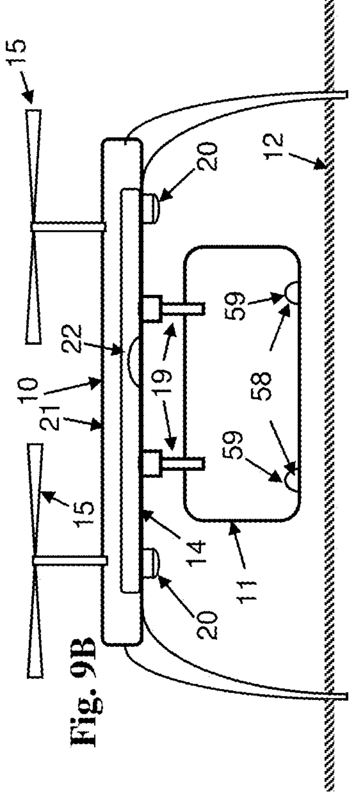
FIG. 9B is a simplified illustration of a side view of the system shown in FIG. 9A.
Figure 9A:
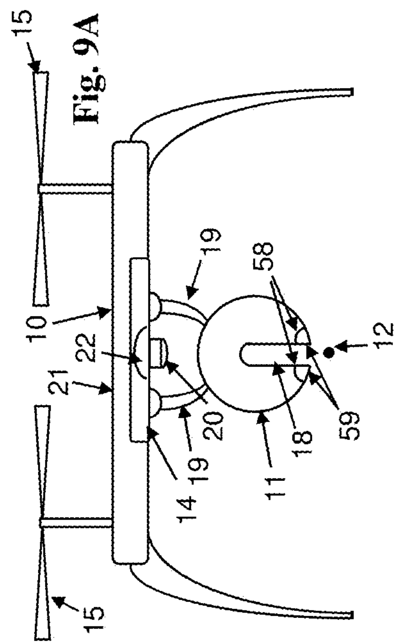
FIG. 9A is a simplified illustration of a front view of flying vehicle and integral mounting part carrying a cable device below the flying vehicle.

Reference is now made to FIG. 9A, which is a simplified illustration of a front view of flying vehicle 10 and integral mounting part 14, carrying a cable device 11 below the flying vehicle 10, and to FIG. 9B, which is a simplified illustration of a side view of the system shown in FIG. 9A, according to one exemplary embodiment of the invention.

As an option, the illustrations of FIGS. 9A and 9B may be viewed in the context of the details of the previous Figures. Of course, however, the illustration of FIGS. 9A and 9B may be viewed in the context of any desired environment. Further, the aforementioned definitions may equally apply to the description below.

As shown in FIGS. 9A and 9B, in addition to a first navigation device included in flying vehicle 10 and/or mounting part 14 (e.g., navigation part 22), there is a second navigation device 58, included in cable device 11. The second navigation device 58 may be used to navigate flying vehicle 10 in the proximity of electric cable 12. In the example shown in FIGS. 9A and 9B the proximity (second) navigation device 58 includes four sensors 59 to precisely align cable device 11 with cable 12. Sensors 59 may be imaging sensors (e.g., camera, ultrasound, etc.), heat sensors, electromagnetic sensors, etc.

As shown in FIGS. 9A and 9B, cable device 11 may be mounted below flying vehicle 10 with its slot 18 opened downwards. Flying vehicle 10 may then approach electric cable 12 from above, inserting electric cable 12 into slot 18 from below.

Figure 10:
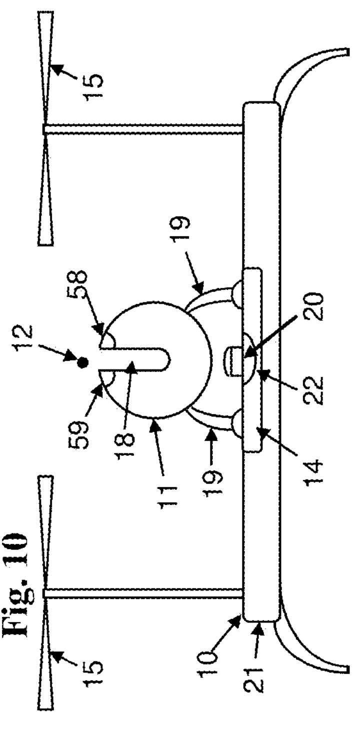
FIG. 10 is a simplified illustration of a front view of flying vehicle and integral mounting part, carrying a cable device above the flying vehicle.

Reference is now made to FIG. 10, which is a simplified illustration of a front view of flying vehicle 10 and integral mounting part 14, carrying a cable device 11 above the flying vehicle 10, according to one exemplary embodiment of the invention.

As an option, the illustrations of FIG. 10 may be viewed in the context of the details of the previous Figures. Of course, however, the illustration of FIG. 10 may be viewed in the context of any desired environment. Further, the aforementioned definitions may equally apply to the description below.

The system of FIG. 10 differs from the system of FIGS. 9A and 9B in that the cable device 11 may be mounted above flying vehicle 10 with its slot 18 opened upwards. Therefore flying vehicle 10 approaches electric cable 12 from below, and then electric cable 12 may thus be inserted into slot 18 from above. This configuration may be advantageous aerodynamically, for example, if wind pushes aside flying vehicle 10 when engaged with electric cable 12.

Figure 11:
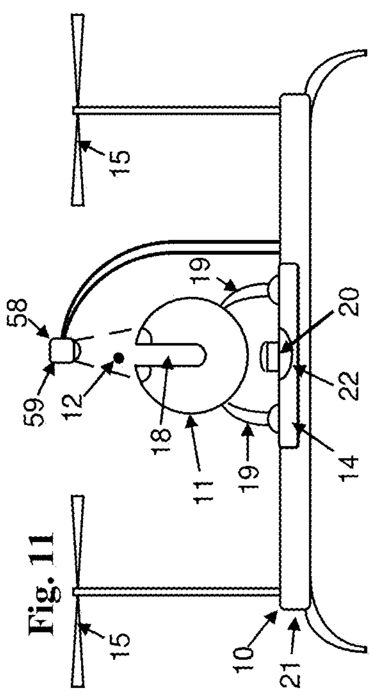
FIG. 11 is a simplified illustration of a front view of flying vehicle and integral mounting part, carrying a cable device above the flying vehicle with one or more inward (downward) looking proximity (second) navigation device.

Reference is now made to FIG. 11, which is a simplified illustration of a front view of flying vehicle 10 and integral mounting part 14, carrying a cable device 11 above the flying vehicle 10 with one or more inward (downward) looking proximity (second) navigation device 58, according to one exemplary embodiment of the invention.

As an option, the illustrations of FIG. 11 may be viewed in the context of the details of the previous Figures. Of course, however, the illustration of FIG. 11 may be viewed in the context of any desired environment. Further, the aforementioned definitions may equally apply to the description below.

The system of FIG. 11 differs from the system of FIG. 10 (as well as the system of FIGS. 9A and 9B) in that proximity (second) navigation device 58 is mounted on mounting part 14 (and flying vehicle 10) instead of cable device 11. As shown in FIG. 11, proximity (second) navigation device 58 is mounted looking inwards, and/or down, and/or into slot 18 of cable device 11.

Therefore, the system of FIG. 11 has the aerodynamic properties of the system of FIG. 10, however, there is no need to include a proximity (second) navigation device 58 in each cable device 11.

Cable device 11 may be mounted above flying vehicle 10 with its slot 18 opened upwards. Therefore flying vehicle 10 approaches electric cable 12 from below, and then electric cable 12 may thus be inserted into slot 18 from above under the guidance of proximity (second) navigation device 58 looking down.

Figures 12, 13:
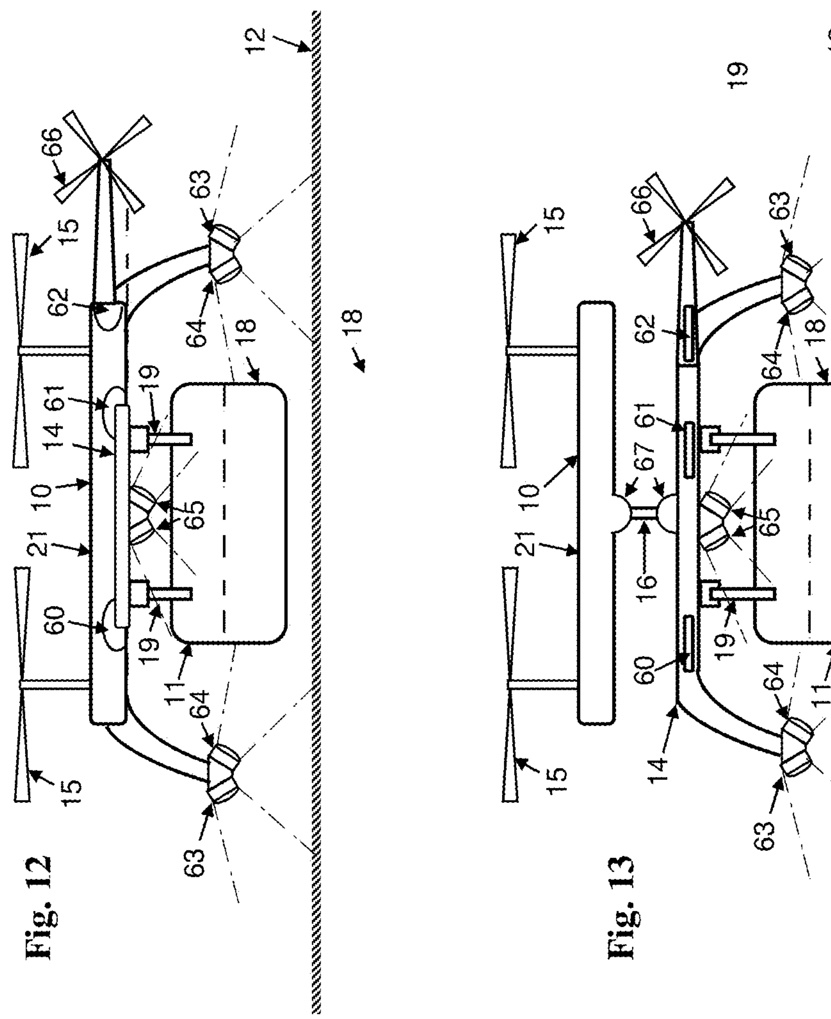
FIG. 12 is a simplified illustration of a side view of flying vehicle and integral mounting part, carrying a cable device with a long range navigation device, a short range navigation device, and a precision maneuvering device.
FIG. 13 is a simplified illustration of a side view of flying vehicle and attachable mounting part equipped with a long range navigation device, a short range navigation device, and a precision maneuvering device.

Reference is now made to FIG. 12, which is a simplified illustration of a side view of flying vehicle 10 and integral mounting part 14, carrying a cable device 11 with a long range navigation device 60 and a short range navigation device 61, as well as a precision maneuvering device 62, according to one exemplary embodiment of the invention.

As an option, the illustrations of FIG. 12 may be viewed in the context of the details of the previous Figures. Of course, however, the illustration of FIG. 12 may be viewed in the context of any desired environment. Further, the aforementioned definitions may equally apply to the description below.

As shown in FIG. 12, the system of flying vehicle 10 and integral mounting part 14 may also include a first, long-range, navigation device 60, and a second, sort-range, navigation device 61. These two systems may be equipped with their own sensors. As shown in FIG. 12, the first, long-range, navigation device 60 includes imaging sensors such as cameras 63 directed outwards, away from cable device 11, and the second, short-range, navigation device 61 includes imaging sensors such as cameras 64 directed inwards, towards cable device 11, particularly to the slot 18 of the cable device 11.

The first, long-range, navigation device 60 may enable a user using a remote control to navigate the system of flying vehicle 10 and integral mounting part 14 to the electric grid 13, then to a particular electric cable 12, and then to a particular location, or part of electric cable 12. Thereafter the second, short-range, navigation device 61 may enable the user, using the same or a different remote control, to navigate the system of flying vehicle 10, integral mounting part 14, and cable device 11 so that electric cable 12 is inserted into slot 18 of the cable device 11.

Additionally and/or optionally, the second, short-range, navigation device 61 may also include sensors, such as cameras 65, oriented towards the location on cable device 11 where the second coupling part (e.g., arms 19) attach to cable device 11.

The first, long-range, navigation device 60 may enable a user using a remote control to navigate the system of flying vehicle 10 and integral mounting part 14 to the electric grid 13, then to a particular electric cable 12, and then to a cable device 11 mounted on electric cable 12. Thereafter the second, short-range, navigation device 61 may enable the user, using the same or a different remote control, to navigate the system of flying vehicle 10 and integral mounting part 14 so that the second coupling part (e.g., arms 19) properly align with, and attach to, cable device 11.

It is appreciated that the first, long-range, navigation device 60 and/or the second, short-range, navigation device 61 may use any type or combination of types of sensors as described above.

It is appreciated that the first, long-range, navigation device 60 and the second, short-range, navigation device 61 may have an overlapping range, where the two systems are operative, and where hand-over between the systems may be effected, either manually or automatically. For example, within the overlapping range both systems have sufficient accuracy and maneuverability control.

It is appreciated that the last part of flying the flying vehicle 10 using the long-range navigation part may be used to engage the short-range navigation part with the electric cable (for mounting) or with the cable device (for dismounting).

Additionally and/or optionally, the system of flying vehicle 10 and integral mounting part 14 may also include precision maneuvering device 62, typically including maneuvering actuators such as one or more propellers 66. Precision maneuvering device 62 may enable a user using a remote control to navigate the system of flying vehicle 10 and integral mounting part 14 to electric cable 12 (to mount cable device 11, and/or to cable device 11 (to dismount) precisely, with minimum effect on the pitch and roll angles.

Reference is now made to FIG. 13, which is a simplified illustration of a side view of flying vehicle 10 and attachable mounting part 14 equipped with long range navigation device 60, short range navigation device 61, as well as precision maneuvering device 62, according to one exemplary embodiment of the invention.

As an option, the illustrations of FIG. 13 may be viewed in the context of the details of the previous Figures. Of course, however, the illustration of FIG. 13 may be viewed in the context of any desired environment. Further, the aforementioned definitions may equally apply to the description below.

The system of flying vehicle 10 and attached mounting part 14 according to FIG. 13 differs from the system of flying vehicle 10 and integral mounting part 14 according to FIG. 12 in that the long range navigation device 60, short range navigation device 61, as well as precision maneuvering device 62 are part of the attached mounting part 14 and thus may be transferred from one flying vehicle 10 to another by means of first coupling part, such as coupling device 16.

It is appreciated that a cable sensor mounting system such as described herein typically includes a flying vehicle such as flying vehicle 10 and a mounting part such as mounting part 14 that can be integral with flying vehicle 10, or attached to flying vehicle 10. The cable sensor mounting system may have two navigation systems, typically a long range navigation system and a short range navigation system.

The long range navigation system is used to navigate flying vehicle 10 to the grid 13, and to a particular (location on) electric cable 12, and the short range navigation system is used to precisely align device 11 with electric cable 12. Particularly, when mounting a device 11 on an electric cable 12, the short range navigation system is used to precisely align slot 18 or a similar cable attachment facility of device 11) with electric cable 12. Similarly, when demounting device 11 from electric cable 12, the short range navigation system is used to precisely align flying vehicle 10 and mounting part 14 with device 11.

For example, the long range navigation system may be the native navigation system of the flying vehicle 10 and the short range navigation system may be part of the mounting part 14, such as navigation part 22 and camera 20 as shown and described with reference to FIGS. 1 to 5 as well as FIGS. 9A, 9B, 10 and 11.

Alternatively, for example, as shown and described with reference to FIGS. 12 and 13, mounting part 14 may include both a long range navigation system such as elements 60 and 63, and a short range navigation system such as elements 61 and 64.

It is appreciated that slot 18 is wider than electric cable 12 typically by only few millimeters, and therefore the required precision of the short range navigation system as well as the accompanying precision maneuvering device 62 is very few millimeters, typically smaller than half the difference between the width of slot 18 and the width of electric cable 12.

The precision, or accuracy, of the short range navigation system and precision maneuvering device includes location precision (or accuracy) as described above, and alignment precision (or accuracy), which should be typically better than Sin (0.01) or 0.01 radians.

Therefore, for example, the sensor range of the long range navigation system may have a long focus, typically sensing, for example, an area of at least tenths of square meters with a typical resolution of about one centimeter. The sensor range of the short range navigation system may have a short focus, typically sensing an area less than few tens of square centimeters, with a typical resolution of at least 0.1 millimeter.

Similarly, the long range maneuvering system of flying vehicle 10 may have precision (or accuracy) of 1 centimeter or less, and/or yaw, and/or pitch, and/or roll not better than 0.1 radians, while the short range maneuvering system should have precision (or accuracy) of 0.1 millimeter or better, and/or yaw, and/or pitch, and/or roll of at least 0.001 radians.

The precision (or accuracy) requirements described above may refer to mounting a cable device 11 on an electric cable 12, and to demounting a cable device 11 from an electric cable 12. In this respect the precision (or accuracy) requirements may refer to positioning and/or aligning the cable device 11 with respect to the electric cable 12, or positioning and/or aligning the mounting part 14 with respect to cable device 11.

As shown in FIG. 1, the electric cable 12 is typically curved, or concaved, and therefore, at the location of mounting and/or dismounting, electric cable 12 may be slanted, and/or at an arbitrary pitch angle to the horizon or the vector of gravitation.

Cable device 11 should be mounted on electric cable 12 with slot 18 aligned vertically. However, as shown in FIG. 1, cable device 11 may be found mounted on electric cable 12 at an arbitrary roll angle.

Therefore, the precision (or accuracy) requirements may refer to any of yaw angle, pitch angle, and roll angle, whether for mounting and/or dismounting, and/or whether for navigation and/or maneuvering.

In this respect, for example, as shown in FIG. 13, coupling device 16, may include manipulating device 67, such as a joint, which enables mounting part 14 to manipulate itself in real-time at an arbitrary angle with respect to flying vehicle 10.

Therefore, while flying vehicle 10 may be positioned horizontally, mounting part 14, using coupling device 16 and manipulating device 67, may rotate itself with respect to flying vehicle 10 and according to the angle(s) of electric cable 12 (for mounting), or cable device 11 (for dismounting). Manipulating device 67, may rotate mounting part 14 with respect to flying vehicle 10 in any of yaw, pitch, and roll angles, or combinations thereof.

Alternatively, or additionally, or optionally, particularly if mounting part 14 is affixed to flying vehicle 10, any of any of yaw, pitch, and roll angles of mounting part 14 may be effected by manipulating the yaw, pitch, and roll angles of flying vehicle 10. This may be effected by precision maneuvering device 62 using one or more propellers 66, and/or by using tilting propellers.

As shown in FIG. 13, coupling device 16, may include two manipulating devices 67 to minimize the effect of manipulating any of the yaw, pitch, and roll angles of any of flying vehicle 10 and mounting part 14 on the center of gravity of the and aerodynamic properties of the system of flying vehicle 10 and mounting part 14 and optional cable device 11. Therefore coupling device 16 with two manipulating devices 67 may enable flying vehicle 10 to tilt responding to wind while mounting part 14 may tilt according to cable orientation (mounting) or cable device 11 orientation (dismounting).

It is appreciated that coupling device 16 with one or more manipulating devices 67 may be provided on top of flying vehicle 10, so as to carry cable device 11 above flying vehicle 10, as shown and described with reference to FIG. 11.

It is appreciated that the second coupling part, such as arms 19, may also provide functionality such as maneuverability of cable device 11 with respect to mounting part 14 such as by changing yaw, pitch, and/or roll angles.

Figure 14:
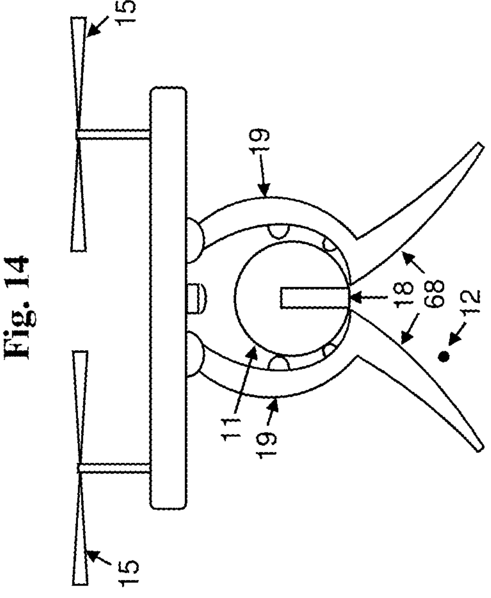
FIG. 14 is a simplified illustration of a front view of flying vehicle with mounting part with a funnel for guiding the slot of the cable device to the cable, or vice versa.

Reference is now made to FIG. 14, which is a simplified illustration of a front view of flying vehicle 10 with mounting part 14 with a funnel 68, according to one exemplary embodiment of the invention.

As an option, the illustration of FIG. 14 may be viewed in the context of the details of the previous Figures. Of course, however, illustration of FIG. 14 may be viewed in the context of any desired environment. Further, the aforementioned definitions may equally apply to the description below.

As shown in FIG. 14, arms 19 of mounting part 14 are shaped to form funnel 68. Funnel 68 is so shaped to lead flying vehicle 10 with mounting part 14 carrying cable device 11, and/or slot 18 of the cable device 11 towards electric cable 12. It is appreciated that mounting part 14 may have two or more such funnels 68 arrange to lead slot 18 towards electric cable 12, and/or vice versa.

It is appreciated that funnel 68 may be part of cable device 11, or part of flying vehicle 10, or part of mounting part 14 other than arms 19. As seem in FIG. 14, arms 19 and funnel 68 also serve as the landing gear of flying vehicle 10.

As shown and described above, the system of flying vehicle 10 and mounting part 14 enables mounting a cable device on an electric cable of an electric grid by performing, for example, the following steps:

Attaching the cable device to a mounting device attached to a flying vehicle.

Flying the flying vehicle, using a long-range navigation part, to the electric cable.

Using the long-range navigation part, directing s short-range navigation part to the electric cable.

Flying the flying vehicle, using the short-range navigation part, to the electric cable while aligning a slot of the cable device with the electric cable.

Mounting the cable device on the electric cable so that the electric cable is inserted in the slot of the cable device.

Similarly, the system of flying vehicle 10 and mounting part 14 enables dismounting a cable device from an electric cable of an electric grid by performing, for example, the following steps:

Flying a flying vehicle, using a long-range navigation part, to the electric cable.

Identifying the cable device mounted on the electric cable.

Using the long-range navigation part, directing s short-range navigation part to the cable device.

Flying the flying vehicle, using the short-range navigation part, to the electric cable, while aligning a mounting part of the flying vehicle to the cable device.

Unlocking the cable device from the electric cable.

Dismounting the cable device from the electric cable.

It is appreciated that certain features, which are, for clarity, described in the context of separate embodiments of the invention, may also be provided in combination in a single embodiment. Conversely, various features, which are, for brevity, described in the context of a single embodiment, may also be provided separately or in any suitable sub-combination.

Although descriptions have been provided above in conjunction with specific embodiments of the invention thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

What is claimed is:

1. A mounting device for at least one of mounting a cable device on an electric cable of an electric grid, and dismounting said cable device from said electric cable, said cable device comprising a slot adapted to engulf said electric cable within said cable device, said mounting device comprising:

one or more manipulating devices arranged to mount said mounting device on top of said flying vehicle, and to mount said cable device above said mounting device, wherein said slot being opened upwards to enable said electric cable to be inserted into said slot from above; and a navigation part operative to perform at least one of:

enable a user to navigate said flying vehicle so as to direct said slot of said cable device to said electric cable; and automatically navigate said flying vehicle to direct said slot of said cable device to said electric cable.

2. The mounting device according to claim 1, wherein said navigation part operative to perform at least one of:

enable a user to control said flying vehicle so as to align said slot of said cable device to said electric cable;

automatically control said flying vehicle so as to align said slot of said cable device to said electric cable;

enable a user to control said flying vehicle so as to mount said cable device on said electric cable;

automatically control said flying vehicle so as to mount said cable device on said electric cable;

enable a user to control said flying vehicle so as to align said mounting device with said cable device mounted on said electric cable; and automatically control said flying vehicle so as to align said mounting device with said cable device mounted on said electric cable.

3. The mounting device according to claim 1, wherein said navigation part is operative to perform at least one of:

navigation using optical imagery of at least one of said electric cable and said cable device; and navigation according to at least one of electric field and magnetic field emitted by at least one of said electric cable and said cable device.

4. The mounting device according to claim 1, additionally comprising a local communication device operative to communicatively couple to a local control system of said flying vehicle so as to perform said automatically control said flying vehicle.

5. The mounting device according to claim 1, additionally comprising a remote communication device communicatively coupled to a remote-control device, said remote communication device communicating with said remote-control device at least one of:

navigation data from said mounting device to said remote-control device; and navigation control data from said remote-control device to said mounting device.

6. The mounting device according to claim 1, additionally comprising a remote-control device operative to enable a user to perform at least one of:

enable a user to control said flying vehicle so as to align said slot of said cable device to said electric cable;

enable a user to control said flying vehicle so as to align said mounting device with said cable device mounted on said electric cable;

enable a user to control said flying vehicle so as to mount said cable device on said electric cable;

enable a user to control said flying vehicle so as to dismount said cable device from said electric cable;

enable a user to switch said mounting device to automatic operation using a communication device communicatively coupled to a local control system of said flying vehicle to perform said automatically control of said flying vehicle.

7. The mounting device according to claim 1, additionally comprising a manipulating device arranged to perform at least one of:

maneuver said mounting device with respect to said flying vehicle in at least one of yaw, pitch and roll angles;

maneuver said cable device with respect to said mounting device in at least one of yaw, pitch and roll angles;

maneuver said cable device with respect to said electric cable in at least one of yaw, pitch, and roll angles;

maneuver said mounting device with respect to said cable device mounted on said electric cable in at least one of yaw, pitch and roll angles;

maneuver said mounting device without affecting at least one of yaw, pitch, and roll angles of said flying vehicle; and maneuver said cable device without affecting at least one of yaw, pitch, and roll angles of said flying vehicle.

8. The mounting device according to claim 7, wherein said mounting device is operative to maneuver said at least one of yaw, pitch and roll angles according to data received from said navigation part.

9. A flying vehicle for mounting a cable device on an electric cable of an electric grid, said flying vehicle comprising:

one or more manipulating devices arranged to mount a mounting part on top of said flying vehicle, and to mount said cable device above said mounting part;

wherein said cable device comprises a slot adapted to engulf said electric cable within said cable device, and wherein said slot is opened upwards to enable said electric cable to be inserted into said slot from above;

a slot navigation part operative to perform at least one of:

enable a user to navigate said flying vehicle so as to direct a slot of said cable device to said electric cable;

automatically navigate said flying vehicle to direct said slot of said cable device to said electric cable;

enable a user to navigate said flying vehicle to said cable device; and automatically navigate said flying vehicle to said cable device.

10. The flying vehicle according to claim 9, additionally comprising:

a long-range navigation part operative to perform at least one of:

enable a user to navigate said flying vehicle to direct said slot navigation part to said electric cable;

automatically navigate said flying vehicle to direct said slot navigation part to said electric cable.

11. A method for maintaining a cable device on an electric cable of an electric grid, said method comprising:

arranging one or more manipulating devices to mount a mounting device on top of a flying vehicle, and to mount said cable device above said mounting device, wherein said cable device comprises a slot adapted to engulf said electric cable within said cable device, and wherein said slot is opened upwards to enable said electric cable to be inserted into said slot from above; and at least one of:

mounting actions comprising:

flying said flying vehicle, using a long-range navigation part, to said electric cable; directing a short-range navigation part to said electric cable;

flying said flying vehicle, using said short-range navigation part, to said electric cable;

aligning a slot of said cable device with said electric cable from below said electric cable; and mounting said cable device on said electric cable wherein said electric cable is inserted in said slot of said cable device; and dismounting actions comprising:

flying the flying vehicle, using a long-range navigation part, to said electric cable;

identifying said cable device mounted on said electric cable;

directing a short-range navigation part to said cable device;

flying said flying vehicle, using said short-range navigation part, to said electric cable;

aligning a mounting device of said flying vehicle to said cable device via a coupling part from below said cable device;

unlocking said cable device from said electric cable; and dismounting said cable device from said electric cable.

12. The method according to claim 11, wherein said step of flying said flying vehicle using said long-range navigation part comprises at least one of:

enabling a user to control said flying vehicle so as to align said slot of said cable device to said electric cable;

automatically controlling said flying vehicle so as to align said slot of said cable device to said electric cable;

enabling a user to control said flying vehicle so as to mount said cable device on said electric cable;

automatically controlling said flying vehicle so as to mount said cable device on said electric cable;

enabling a user to control said flying vehicle so as to align said mounting device with said cable device mounted on said electric cable; and automatically controlling said flying vehicle so as to align said mounting device with said cable device mounted on said electric cable.

13. The method according to claim 11, wherein said step of flying said flying vehicle using said long-range navigation part comprises at least one of:

navigating using optical imagery of at least one of said electric cable and said cable device; and navigating according to at least one of electric field and magnetic field emitted by at least one of said electric cable and said cable device.

14. The method according to claim 11, wherein said step of flying said flying vehicle using said long-range navigation part additionally comprises:

using a local communication device in a mounting device attached to said flying vehicle and communicatively couple to a local control system of said flying vehicle to automatically control said flying vehicle.

15. The method according to claim 11, wherein at least one of said steps of flying said flying vehicle using said long-range navigation part and flying said flying vehicle using said short-range navigation part additionally comprises:

using a remote communication device communicatively coupled to a remote-control device, said remote communication device communicating with said remote-control device at least one of: navigation data from said mounting device to said remote-control device; and navigation control data from said remote-control device to said mounting device.

16. The method according to claim 11, wherein at least one of said steps of flying said flying vehicle using said long-range navigation part and flying said flying vehicle using said short-range navigation part additionally comprises:

enabling a user using a remote control device to control said flying vehicle so as to align said slot of said cable device to said electric cable;

enabling a user using a remote control device to control said flying vehicle so as to align said mounting device with said cable device mounted on said electric cable;

enabling a user using a remote control device to control said flying vehicle so as to mount said cable device on said electric cable;

enabling a user using a remote control device to control said flying vehicle so as to dismount said cable device from said electric cable;

enabling a user using a remote control device to switch said mounting device to automatic operation using a communication device communicatively coupled to a local control system of said flying vehicle to preform said automatically control of said flying vehicle.

17. The method according to claim 11, additionally comprising providing a manipulating device arranged to perform:

maneuvering at least one of: said mounting device with respect to said flying vehicle in at least one of yaw, pitch and roll angles;

said cable device with respect to said mounting device in at least one of yaw, pitch and roll angles;

said cable device with respect to said electric cable in at least one of yaw, pitch, and roll angles;

said mounting device with respect to said cable device mounted on said electric cable in at least one of yaw, pitch and roll angles;

said mounting device, without affecting at least one of yaw, pitch, and roll angles of said flying vehicle; and said cable device, without affecting at least one of yaw, pitch, and roll angles of said flying vehicle.

* * * * *